Figure 1:
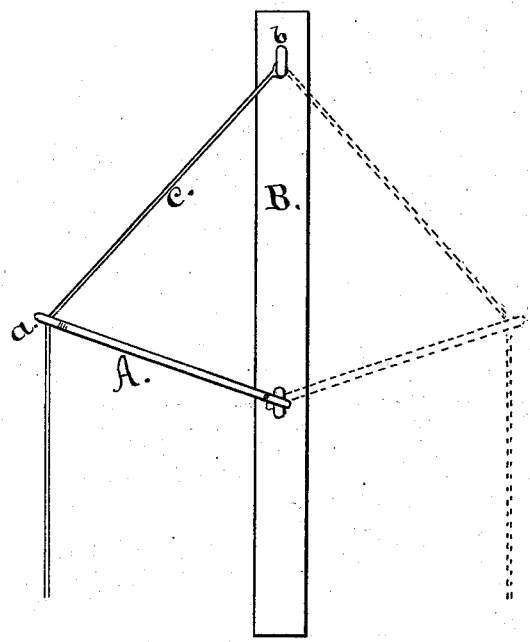

L. L. HAWORTH.
Anchors for Check-Row Cords.

No. 205,266. Patented June 25, 1878.

Witnesses
C. F. Chapman
Bradford Cross

Inventor
L. L. Haworth
Per Levi P. Graham
atty

UNITED STATES PATENT OFFICE.

LYSANDER L. HAWORTH, OF DECATUR, ILLINOIS.

IMPROVEMENT IN ANCHORS FOR CHECK-ROW CORDS.

Specification forming part of Letters Patent No. 205,266, dated June 25, 1878; application filed April 13, 1877.

*To all whom it may concern:*

Be it known that I, LYSANDER L. HAWORTH, of Decatur, Macon county, Illinois, have invented a new and useful Improvement in Anchors for Check-Row Cords, of which the following is a specification:

My invention relates to an improvement in anchors for check-row cords used on corn-planters, and is intended to be used with side-draft check-rowers as a substitute for a sliding anchor in laying over the cord.

By reference to the drawing accompanying and forming a part of this specification, it will be seen that I employ a beam anchored, by means of projections on its lower side, in a direction parallel with that taken by the planter, and provided with a pivoting-arm, through the extremity of which the cord passes, and by means of which said cord is laid over automatically from one side to the other, a distance equal to twice the length of the arm.

The projections or anchors on the beam are placed substantially as shown in the drawing, the part of the beam in front acting as a brace to prevent displacement.

The cord being attached, as shown at $b$, and extended through the arm, as stated, and as shown at $a$, the beam is anchored with its arm laid on, say, the right side, its extremity being directly in the rear of the reciprocating apparatus of the planter. This position is held while the planter crosses the field from the anchor, in returning the turn being made to the left. The tension is gradually up and to the left until, as the planter nears the end, the arm describes a semicircle, laying the cord over directly in front of the planter, which continues planting straight out to the end without any further manipulation.

Figure 2:
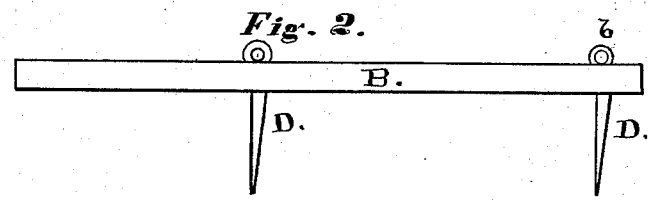
Figure 3:
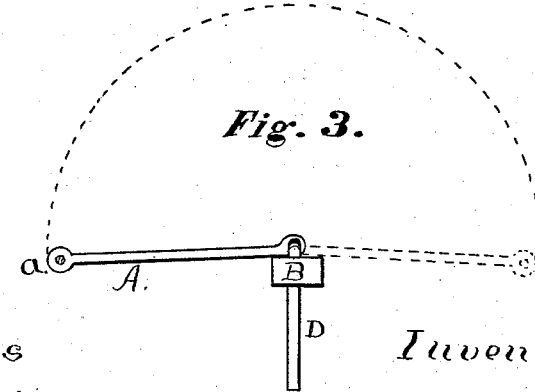

Figure 1 of the drawing is a plan of the anchor, the dotted lines showing the reversed position of the arm and cord. Fig. 2 is a side view of the beam, showing projections on the lower side, by means of which the anchorage is effected. Fig. 3 is an end view, showing the direction of the arm in laying over the cord.

A is the arm; B, the beam; C, the cord attached to the beam B at $b$, and passed through the arm A at $a$. D D are the projections or anchors.

Having thus described my device, what I claim as new and of my invention is—

1. A pivoted bar or arm anchored to the ground, and adapted to carry the check-row cord or wire over laterally as the planter approaches the end of the field or row to be planted, substantially as and for the purpose described.

2. The combination of the pivoted arm or bar A with a stake, D, adapted to be driven into the ground for anchoring said arm, substantially as described.

3. The combination of the pivoted arm A and stakes D D, or their equivalent, for anchoring the check-row cord to the ground, and permitting its lateral vibration, substantially as and for the purpose described.

4. The combination of the pivoted arm A, beam B, and stakes D D, or their equivalent, substantially as and for the purpose set forth.

LYSANDER L. HAWORTH.

Witnesses:
LEVI P. GRAHAM,
H. W. WAGGONER.